(12) United States Patent
Chen et al.

(10) Patent No.: US 6,315,307 B1
(45) Date of Patent: Nov. 13, 2001

(54) COLLAPSIBLE SCOOTER

(76) Inventors: Kai-Wen Chen; Kuang-Huei Chen, both of No. 36, Lung Men Rd., Lung Tung Village, Lung Ching Hsiang, Taichung Hsien (TW)

( * ) Notice: Subject to any disclaimer, the term of this patent is extended or adjusted under 35 U.S.C. 154(b) by 0 days.

(21) Appl. No.: 09/666,307

(22) Filed: Sep. 21, 2000

(51) Int. Cl.[7] .................................. B25G 1/04; B62B 3/02
(52) U.S. Cl. .................... 280/40; 280/87.041; 280/87.05
(58) Field of Search ........................... 280/38–40, 87.041, 280/87.05, 278, 287, 638–641, 205, 206, 208, 219, 220, 223, 210, 231, 907; 403/373; 464/117; D21/423

(56) References Cited

U.S. PATENT DOCUMENTS 6,158,751 * 12/2000 Wu .................................. 280/87.041
6,182,988 * 2/2001 Wu .................................... 280/87.05

* cited by examiner

Primary Examiner—Douglas C. Butler
Assistant Examiner—C. T. Bartz
(74) Attorney, Agent, or Firm—Rosenberg, Klein & Lee

(57) ABSTRACT

A collapsible scooter has a frame plate secured on a head tube of the scooter, a strut having a lower end thereof pivotally connected to a foot board of the scooter and an upper end thereof pivotally connected to the frame plate. Opposite sides of the frame plate are symmetrically defined with two pivot slots, the upper end of the strut is pivotally connected with the frame plate and movable along the pivot slots between an upper position in which the scooter is fully collapsed and a lower position in which the head tube is uprightly extended. A retaining device is particularly provided in the scooter to prohibit the head tube from any inadvertent movement relative to the foot board, even when the head tube is subjected to excessive stress during riding on a rough road.

5 Claims, 6 Drawing Sheets

COLLAPSIBLE SCOOTER

BACKGROUND OF THE INVENTION

1. Field of the Invention

The present invention relates to a collapsible scooter with a retaining device which is capable of securely retaining a head tube of the scooter at an upright operation position in order to ensure safety of the operation of the scooter.

2. Description of Related Art

Scooters are becoming increasingly popular again because they are easily and conveniently operated by a rider for not only sport but also transportation. To be stored more compactly and carried more conveniently, the scooters are mostly collapsible. One conventional collapsible scooter as shown in FIG. 7 comprises a foot board (50), a steering assembly (52) pivotally connected to a front end of the foot board (50), a front wheel (54) rotatably mounted at a lower end of the steering assembly (52), a rear wheel (56) rotatably mounted at a rear end of the foot board (50), and a hydraulic spring strut (60) having an upper end thereof pivotally connected to the steering assembly (52) and a lower end thereof pivotally connected to the foot board (50). Wherein the hydraulic spring strut (60) is utilized to support the steering assembly (52) in an upright operating position for riding when it is extended and to collapse the steering assembly (52) to a position substantially parallel to the foot board (50) for storing when it is fully compressed.

Another conventional collapsible scooter as shown in FIG. 8 comprises a foot board (70), a steering assembly (72), a strut (74) and a folding bracing strut (76) having an upper section (760) and a lower section (762). An upper end of the upper section (760) is pivotally connected to the steering assembly (72), a lower end of the upper section (760) is pivotally connected to an upper end of the lower section (762), and a lower end of the lower section (762) is pivotally connected to the foot board (70). When the steering assembly (72) is securely positioned in an upright operation position, the folding bracing strut (76) is extended and releasably locked in a straight line. When the scooter needs to be collapsed, the folding bracing strut (76) is unlocked and folded in a way that the steering assembly (72) can be pivotally folded in a position substantially parallel to the foot board (70).

An important defect of the above disclosed collapsible scooters is that each of the steering assemblies is not positioned at its upright operation position firmly enough to prevent an inadvertent movement of the steering assembly in relation to the foot board, especially when the rider is riding on a rough road. If the hydraulic spring strut is suddenly compressed, or the folding bracing strut is released from the locking status, the steering assembly will pivotally move relative to the foot board (50), which may result in a falling or a loss of balance of the rider. Therefore an inherent structure weakness of the above disclosed conventional scooters exists in their operation position.

Therefore, it is an objective of the invention to provide a scooter with adequate structure support to mitigate and/or obviate the aforementioned problems.

SUMMARY OF THE INVENTION

The object of the present invention is to provide a collapsible scooter which comprises a frame plate secured on a head tube of the scooter, a strut having a lower end thereof pivotally connected to a foot board of the scooter and an upper end thereof pivotally connected to the frame plate. Opposite sides of the frame plate are symmetrically defined with two pivot slots, and the upper end of the strut is pivotally connected with the frame plate and movable along the pivot slots between an upper position in which the scooter is fully collapsed and a lower position in which the head tube is uprightly extended. A retaining device is particularly provided in the scooter to prohibit the head tube from any inadvertent movement relative to the foot board, even when the head tube is subjected to significant stress due to the rider travelling on a rough road.

Other objects, advantages and novel features of the invention will become more apparent from the following detailed description when taken in conjunction with the accompanying drawings.

DETAILED DESCRIPTION OF THE PREFERRED EMBODIMENT

Figure 1:
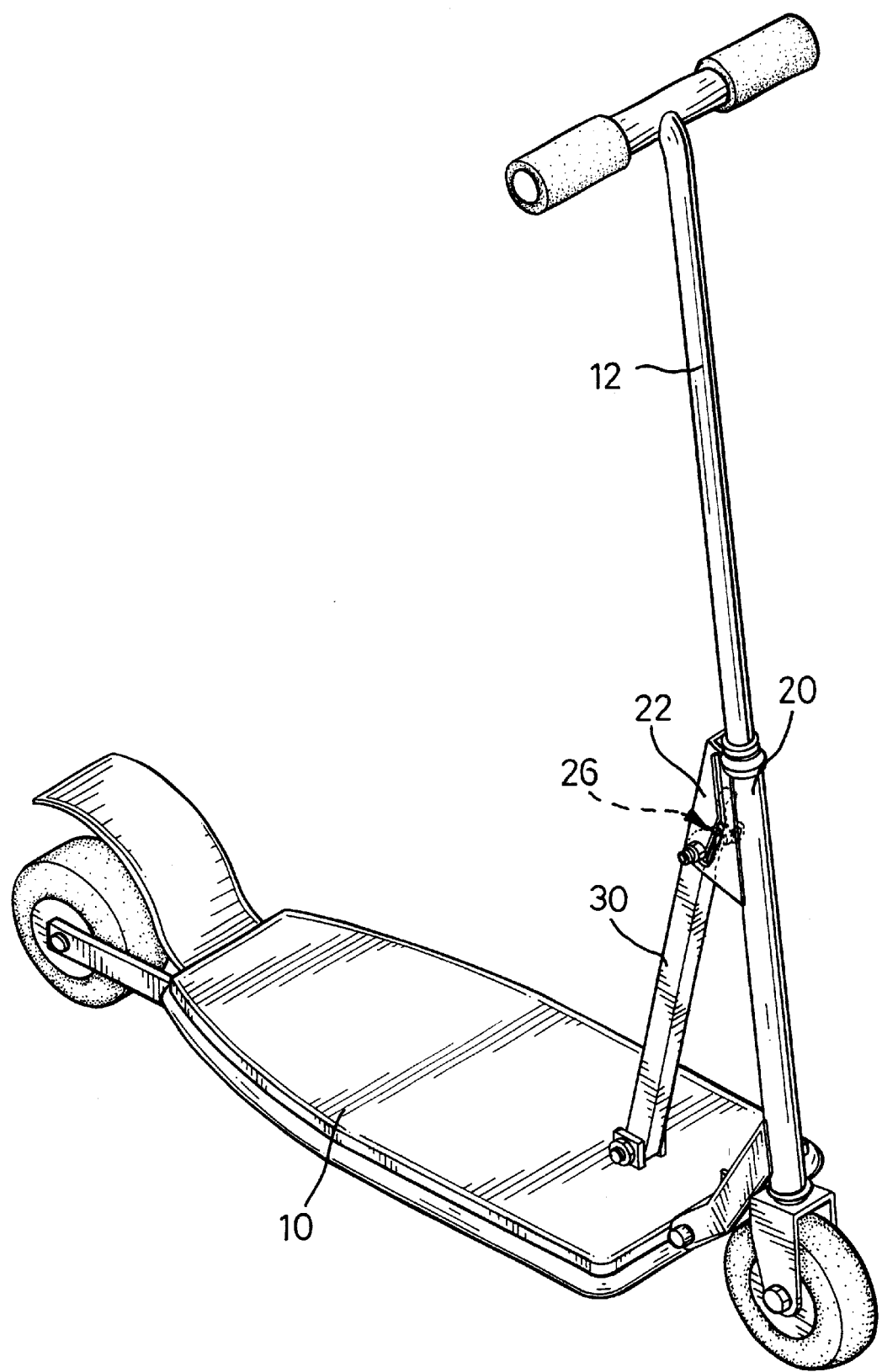
FIG. 1 is a perspective view of a collapsible scooter in accordance with the invention.
Figure 2:
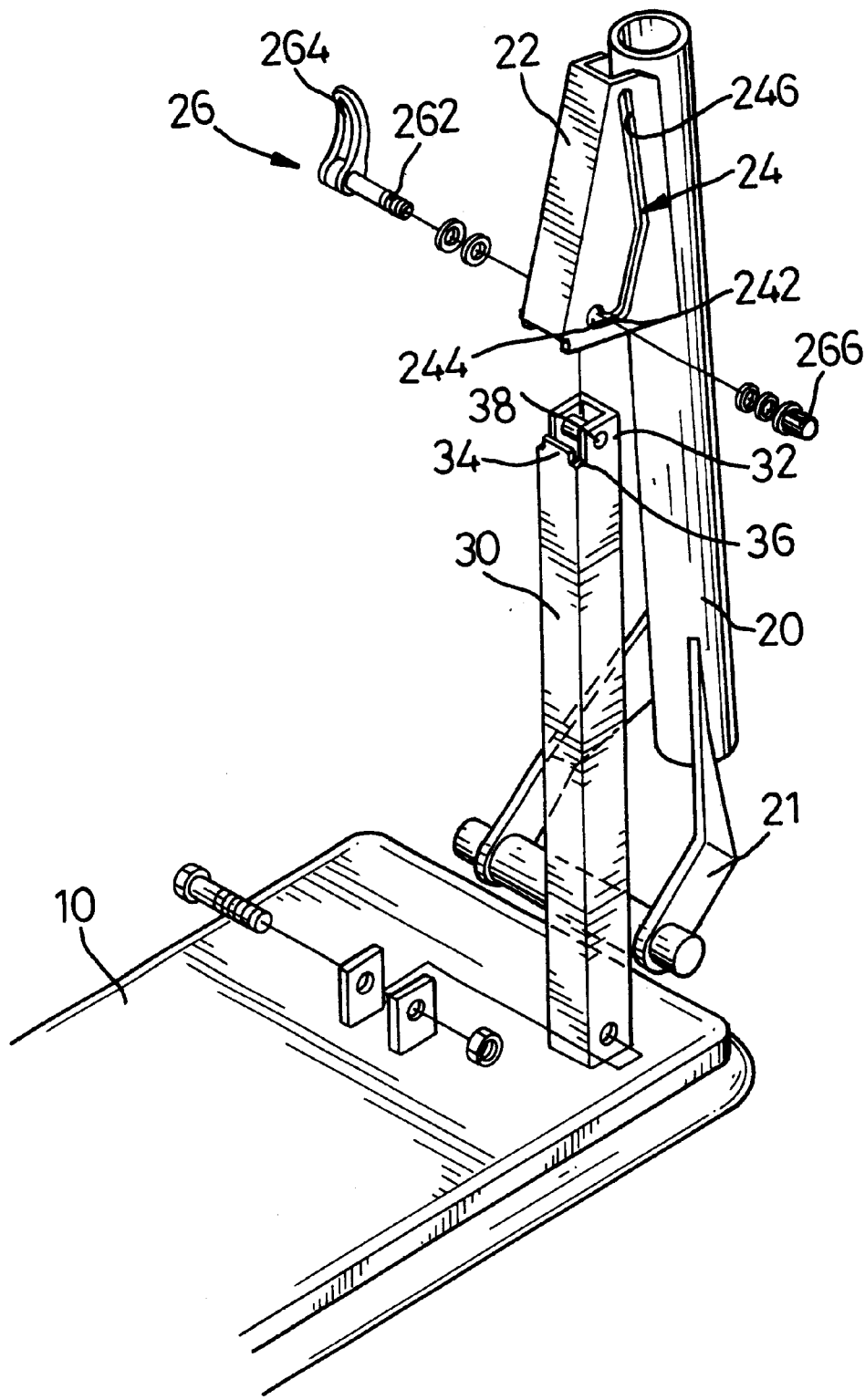
FIG. 2 is a partial exploded perspective view of a head tube of the collapsible scooter in accordance with the invention.

With reference to FIGS. 1 and 2, a collapsible scooter in accordance with the present invention comprises a foot board (10), a steering assembly, a front wheel rotatably mounted at a lower end of the steering assembly and a rear wheel rotatably mounted at a rear end of the foot board (10).

The steering assembly includes a head tube (20) pivotally connected at a front end of the foot board (10) via a connecting member (21) and a handlebar stem (12) telescopically attached to a top portion of the head tube (20).

A strut (30) has an upper end pivotally connected to the head tube (20) and a lower end pivotally connected to the foot board (10).

A frame plate (22) having a C-shaped cross section is securely mounted on the head tube (20) near an upper end of the head tube (20). Opposite sides of the frame plate (22) are therein respectively defined with two pivot slots (24). Each pivot slot (24) consists of a lateral section (242), a bayonet (244) at a first end of the lateral section (242) and an upward section (246) at a second end of the lateral section (242). The upward section (246) extends from the second end of the lateral section (242) in an upward direction inclined to the head tube (20) and then turns to an upward direction inclined to the strut (30). Although in the preferred embodiment two pivot slots (24) are provided, it is also practical for only one pivot slot (24) to be included.

The upper end of the strut (30) further has a nose (32) formed at a front side thereof near the head tube (20), a lip (34) formed at a rear side thereof, a groove (36) defined between the nose (32) and the lip (34), and a pivot hole (38) defined in the nose (32).

An axle (262) of a locking device (26) has a trigger bar (264) fixed at one end thereof. Another end of the axle (262) is extended sequentially through a first of the pivot slots (24), the pivot hole (38) of the strut (30) and the other pivot slot (24) of the frame plate (22), and threadingly engaged with a nut (266). Multiple washers are respectively provided between opposite sides of the frame plate (22) and the trigger bar (264) and the nut (266).

Figure 3:
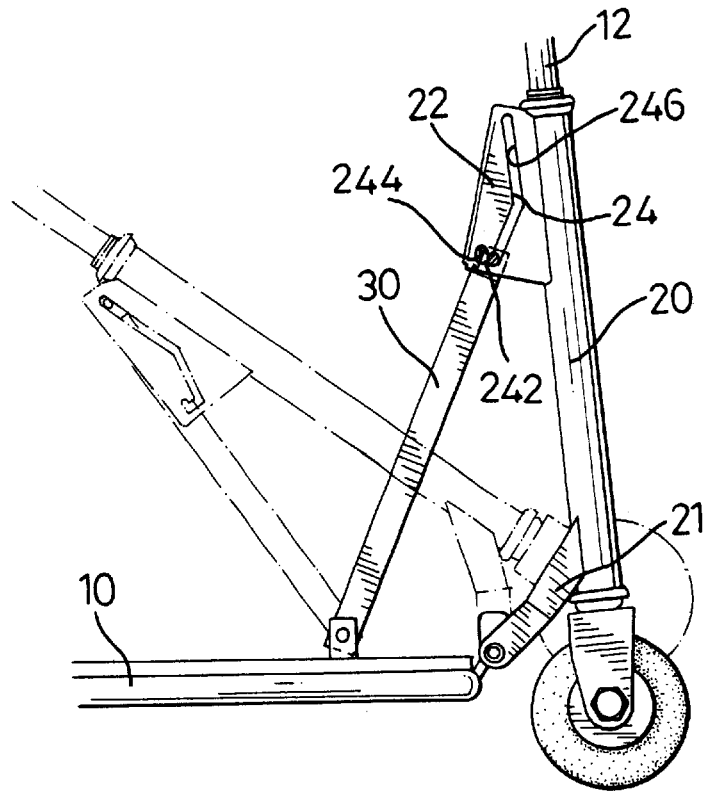
FIG. 3 is a partial side schematic view of the collapsible scooter in accordance with the invention, showing the head tube being pivotally movable relative to the foot board.
Figure 6:
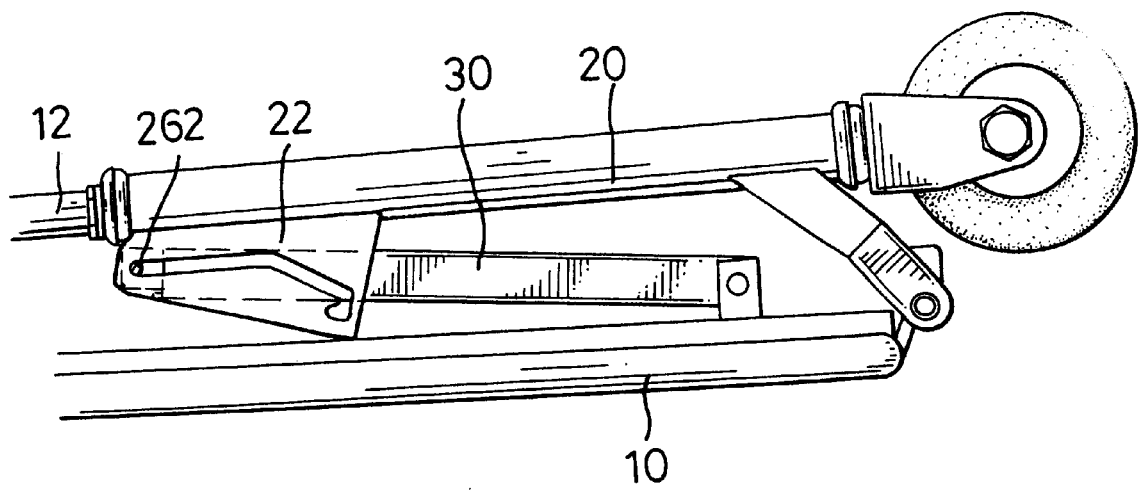
FIG. 6 is a partial side schematic view of the collapsible scooter in accordance with the invention, showing the scooter in a collapsed position.
Figure 7:
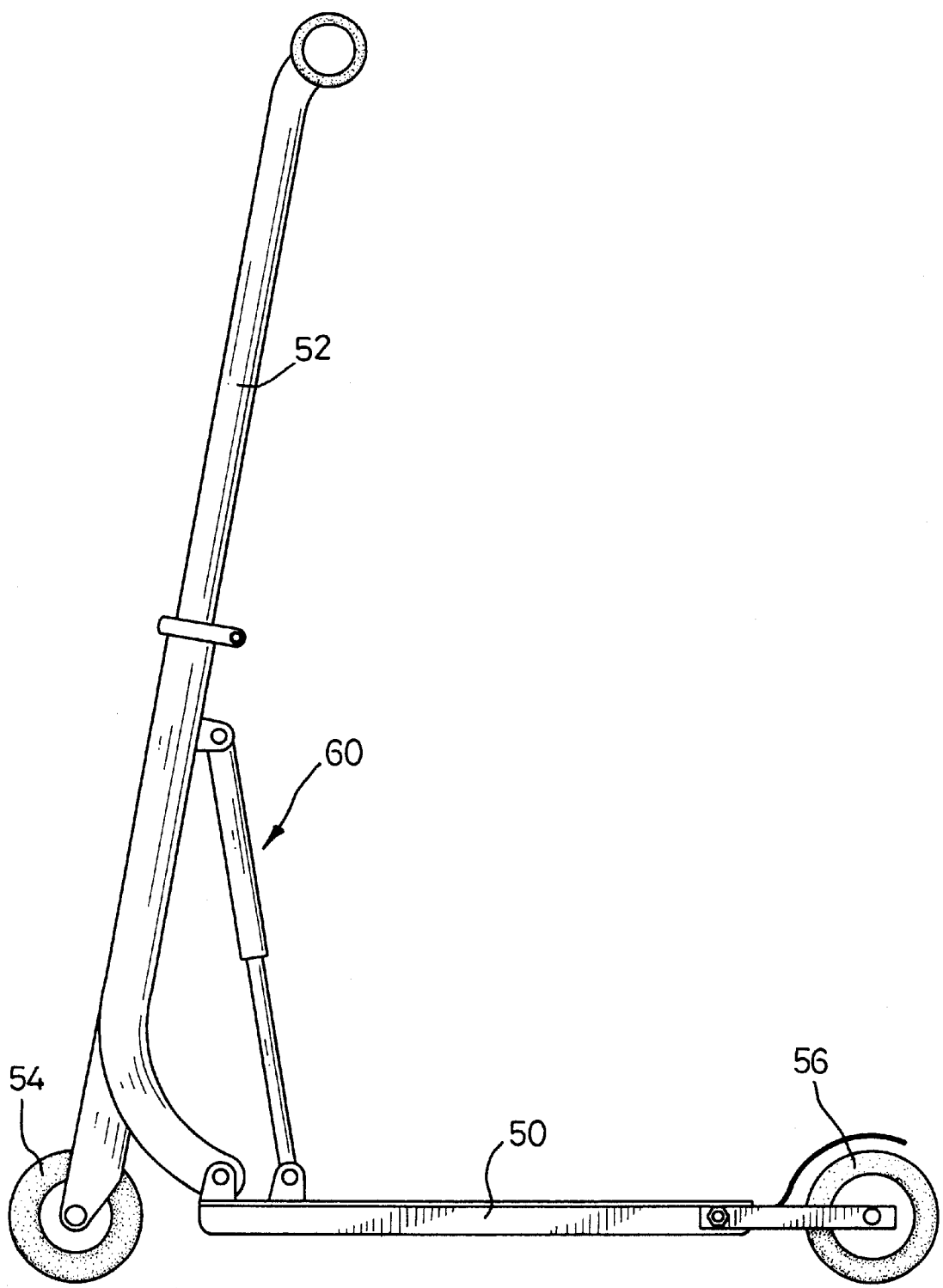
FIG. 7 is a side plan view of a first conventional collapsible scooter.
Figure 8:
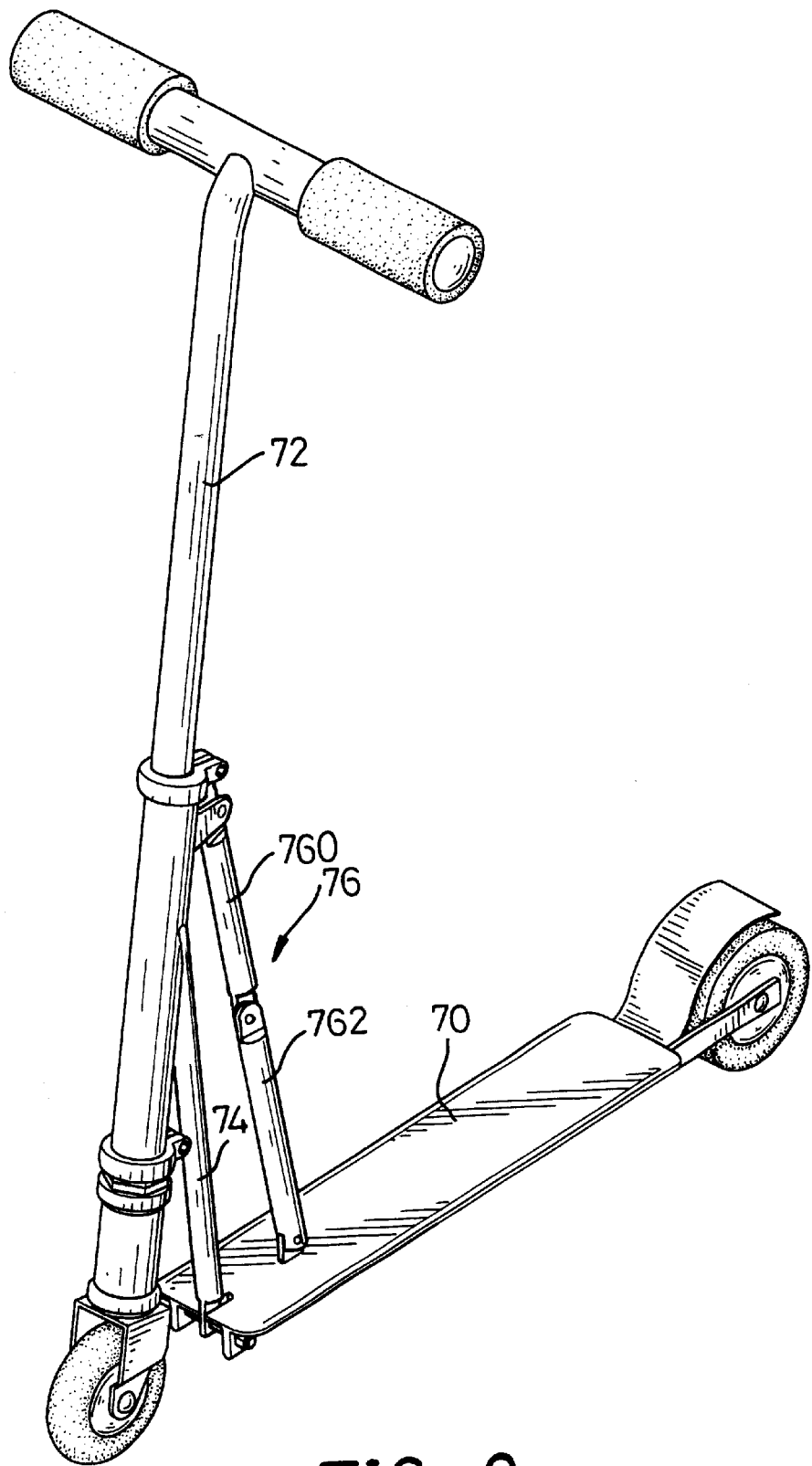
FIG. 8 is a perspective view of a second conventional collapsible scooter.

As shown in FIG. 3, when the locking device (26) is released, the axle (262) of the locking device (26) is movable along the pivot slots (24) of the frame plate (22) between a lower position in which the head tube (20) is uprightly extended and an upper position in which the head tube (20) is collapsed to a position that is substantially parallel to the foot board (10), as shown in FIG. 6.

Figure 4:
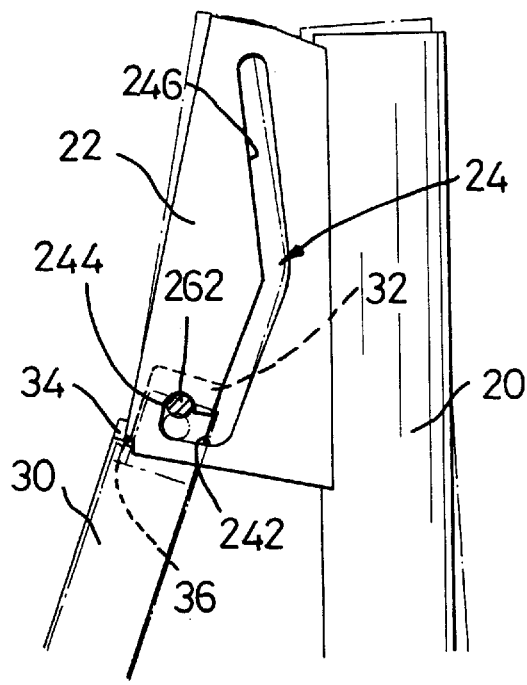
FIG. 4 is a partial side schematic view of the collapsible scooter in accordance with the invention, showing the head tube is secured in an upright operation position by a retaining device of the scooter.

In the upright operation position as best seen in FIG. 4, the axle (262) slides from the lateral section (242) into the bayonet (244), and in the mean time a front lower edge of the frame plate (22) is inserted into the groove (36) of the upper end of the strut (30). Then the locking device (26) tightly locks the head tube (20) with the strut (30) in the operation position. The bayonet (244) corresponding to the axle (262) and the groove (36) corresponding to the front lower edge of the frame plate (22) are provided as retaining devices. When a downward force from a rider acts on the head tube (20) via the handle stem (12), the head tube (20) is firmly retained at the upright operation position. In such a way, any excessive force occurring during riding can not push the head tube (20) to be released from the connection with the strut (20), even in the case of an undesired releasing of the locking device (26) happening.

Figure 5:
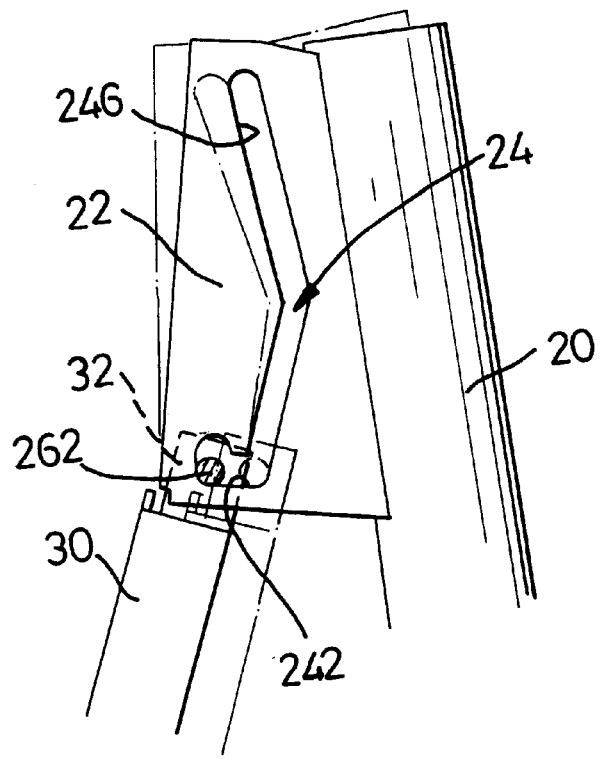
FIG. 5 is a partial side schematic view of the collapsible scooter in accordance with the invention, showing the head tube is released from the retaining device of the scooter.

With reference to FIGS. 5 and 6, when the scooter needs to be collapsed, the locking device (26) is released first. Then the head tube (20) and the strut (30) are respectively pushed in a direction towards the front end of the foot board (10) slightly to release the axle (262) from the bayonet (244) of the pivot slots (24). The axle (262) slides from the lateral section (242) towards the upright section (246) of each of the pivot slots (24), meanwhile the head tube (20) pivotally moves towards the foot board (10) to the fully collapsed position that is substantially parallel to the foot board (10), as shown in FIG. 6. The scooter can also be tightly locked in the fully collapsed position via the locking device (26).

From the above description, it is noted that the invention has the following advantages:

1. the collapsible scooter of the invention has a simple structure, so that the manufacturer is able to produce the product at a low cost.
2. the collapsible scooter of the invention can be operated by a rider in a very safe manner because the head tube (20) is prohibited from pivotally moving relative to the foot board (10) during riding in any kind of situation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A collapsible scooter comprising a foot board (10), a steering assembly including a head tube (20) pivotally connected at a front end of the foot board (10) and a handlebar stem (12) telescopically attached to a top portion of the head tube (20), a front wheel rotatably mounted at a lower end of the steering assembly and a rear wheel rotatably mounted at a rear end of the foot board (10), wherein the improvements comprise:

a strut (30) having an upper end and a lower end, the upper end being pivotally connected to the head tube (20), and the lower end being pivotally connected to the foot board (10), the upper end of the strut (30) further having a nose (32) formed at a front side thereof near the head tube (20), a lip (34) formed at a rear side thereof, a groove (36) defined between the nose (32) and the lip (34), and a pivot hole (38) defined in the nose (32);

a frame plate (22) having an C-shaped cross section being securely mounted on the head tube (20) near an upper end of the head tube (20), and at least one side of the frame plate (22) being defined with a pivot slot (24) which consists of a lateral section (242), a bayonet (244) at a first end of the lateral section (242) and an upright section (246) at a second end of the lateral section (242);

a locking device (26) having an axle (262) with two ends, a trigger bar (264) fixed at one of the ends of the axle (262), the other end of the axle (262) being extended through the pivot hole (38) of the strut (30) and the pivot slot (24) of the frame plate (22), and threadingly engaged with a nut (266);

whereby when the head tube (20) is extended to an upright operation position, the axle (262) of the locking device (26) is inserted into the bayonet (244) of the frame plate (22) and a front lower edge of the frame plate (22) is inserted into the groove (36) of the strut (30), then the locking device (26) tightly locks the strut (30) with the head tube (20) in the operation position, so that the head tube (20) of the scooter is securely retained and prohibited from any pivotal movement relative to the foot board (10).

2. The collapsible scooter as claimed in claim 1, wherein the upright section (246) extends from the second end of the lateral section (242) in an upward direction inclined to the head tube (20) and then turned to an upward direction inclined to the strut (30).

3. The collapsible scooter as claimed in claim 1, wherein multiple washers are respectively provided between opposite sides of the frame plate (22) and the trigger bar (264) and the nut (266).

4. The collapsible scooter as claimed in claim 1, wherein a connecting member (21) is secured at a lower end of the head tube (20) at one end thereof and pivotally connected to the front end of the foot board (10) at another end thereof.

5. The collapsible scooter as claimed in claim 1, wherein two opposed sides of the frame plate (22) are symmetrically each defined with one slot (24), and the other end of the trigger bar (26) is sequentially inserted through a first of the slots (24), the pivot hole (38) of the strut (30) and the second of the slots (24), and threadingly engaged with the nut (266).

* * * * *